3,382,652
TWO-COAT ANALYTICAL ULTRAFILTER AND
A METHOD OF MAKING THE SAME
Květoslav Spurný, Prague, and Emil Wiesner, Svit pod Tatrami, Czechoslovakia, assignors to Ceskoslovenska akademie ved, Prague, Czechoslovakia
No Drawing. Filed Oct. 22, 1965, Ser. No. 502,309
Claims priority, application Czechoslovakia,
Nov. 2, 1964, 6,079/64
11 Claims. (Cl. 55—486)

ABSTRACT OF THE DISCLOSURE

An analytical, composite ultrafilter for simultaneously separating solid particles of greatly varying dimensions from a suspension thereof in a stream of gas, which filter includes a first fibrous filter layer having a pore size such that only larger solid particles will be retained by it; and a second filter layer superposed upon and contacting the first filter layer and consisting of a xerogel having a pore size sufficiently small to retain the smaller solid particles, so that, upon passing a gas having the larger and smaller solid particles suspended therein through the composite ultrafilter in the direction from the first filter layer towards the second filter layer, the larger particles will be retained by the first filter layer and the smaller particles by the second filter layer.

---

The invention relates to a two-layer analytical ultrafilter and to a method of making the same.

The ultrafilter has excellent filtration properties and is very useful for capturing or intercepting samples of industrial aerosol mixtures and roughly dispersed dust. Analytical two-layer ultrafilters in which each filtration coat has different filtration properties have not yet been disclosed.

Fibrous two-layer analytical filters are already known in which each filtration layer has the same filtration properties. The lower layer is often used only for reinforcement, that is for carrying the upper filtration layer. These filters are only single-purpose devices, they can therefore not intercept impurities of all the different sizes occurring on an average in the given surroundings. Industrial aerosols and roughly dispersed industrial dust could hitherto be captured either by a fibrous filter which intercepts a larger amount of roughly dispersed dust aerosol, but does not intercept small and very small particles, or by a gel or diaphragm type filter which, however, cannot intercept more than a minute amount of smaller particles. But such a filter becomes soon choked with larger particles.

None of these filters can intercept impurities of the whole range of impurities and in the required amount. Known two-layer textile filters can therefore not be applied universally.

Two-layer filters have hitherto been made in the following manner: On the casting plate is first poured a base layer-forming polymer solution for forming after drying a layer having a thickness of 1 to 5 microns. On this carrier layer is then poured a further polymer solution which forms the diaphragm filter proper. The bottom layer acts as the carrier and the top layer serves for filtering. Both layers are perfectly united so that their cohesion need not be secured by an additional production step. A punch is used for cutting out disk-shaped filters from the thus-made filtration strip.

The general object of the invention is to eliminate the drawbacks of the known state of art.

Stated briefly but more specifically, the ultrafilter in accordance with the invention comprises a top filtration layer made of organic synthetic micro-fibres larger than 1 $\mu$m., for example from chlorinated PVC, this top layer being applied on the lower filtration layer made from xerogels of natural or synthetic polymers, for intercepting impurities larger than 0.1$\mu$, for example from xerogels of nitrocellulose.

The method of producing a two-layer analytical ultrafilter in accordance with the invention consists in the following steps; the two filtration layers are cold-pressed and then united by means of a punch heated below the melting point of the employed polymers, and finally they are cut out to the required shape.

The advantage of this combined two-layer ultrafilter resides in the fact that it can be universally used, both for roughly dispersed dust particles and for finely dispersed aerosols. The roughly dispersed dust particles are captured in the upper layer, that is in the fibrous filter, with an efficiency higher than 99%, and they stick thereto firmly and do not fall off therefrom. The majority of the aerosol particles pass through the upper fibrous layer and are practically all intercepted only in the lower layer of the diaphragm filter. In this manner the concentration of the aerosols and roughly dispersed dust can be simultaneously ascertained by gravity measurement. The entire filter can be readily dissolved, for example in aceton, and the sample can be analysed physically and chemically. The filter is non-hygroscopic and lends itself readily to gravimetric measurement of concentration. The higher effect of the thus-combined filter resides in the possibility of intercepting a sufficiently large amount of all sizes of impurities which currently occur.

The upper filtration layer of this two-layer analytical ultrafilter forms a fibrous filter with a very low pressure gradient and with an efficiency which is higher than 90% for particles larger than 1$\mu$. The lower filtration layer forms a diaphragm filter with an efficiency of 99% for particles larger than 0.1$\mu$.

The filter in accordance with the invention is made of a diaphragm filter with a pore size approximately 0.8$\mu$. Upon this filtration material is applied a coat of organic micro-fibres, for example chlorinated PVC with an average fibre thickness 1.5$\mu$. The two layers are then cold-pressed. From this filtration material disks are cut by means of a special punch which operates in the following manner: A metal ring heated below the melting point of the diaphragm filter is pressed against the filtration material. In this manner the edges of the two layers are perfectly united. The filtration disk is then cut out by means of a sharp punch at the zone at which the two layers had been united by the heated ring.

What we claim is:

1. An analytical, composite ultrafilter for simultaneously separating solid particles of greatly varying dimensions from a suspension thereof in a stream of gas, said filter consisting essentially of a first fibrous filter layer having a pore size such that only the larger of said solid particles will be retained by said first fibrous filter layer; and of a second filter layer superposed upon and contacting said first filter layer and consisting essentially of a xerogel having a pore size sufficiently small to retain the smaller of said solid particles, so that upon passing a gas having said larger and smaller solid particles suspended therein through said composite ultrafilter in the direction from said first filter layer towards said second filter layer, said larger particles will be retained by said first, fibrous filter layer and said smaller particles will pass through said first filter layer to be retained by said second filter layer.

2. An analytical filter as defined in claim 1, wherein said first fibrous filter layer consists essentially of microfibers of organic synthetic material, and said xerogel consists of polymeric material.

3. An analytical filter as defined in claim 2, wherein said microfibers have average diameters larger than $1\mu$.

4. An analytical filter as defined in claim 3, wherein said microfibers consist essentially of polyvinyl chloride.

5. An analytical filter as defined in claim 4, wherein said polyvinyl chloride microfibers have average diameters of about $1.5\mu$.

6. An analytical filter as defined in claim 1, wherein said second filter layer is a diaphragm formed essentially of a xerogel.

7. An analytical filter as defined in claim 6, wherein said xerogel diaphragm has pores of an average size below $1\mu$.

8. An analytical filter as defined in claim 7, wherein the average pore size of said xerogel diaphragm is about $0.8\mu$.

9. An analytical filter as defined in claim 7, wherein said xerogel consists essentially of nitrocellulose.

10. An analytical filter as defined in claim 1, wherein said first filter layer is a compressed layer of polyvinyl chloride microfibers having an average diameter of about $1.5\mu$, and said second filter layer is a diaphragm consisting essentially of a compressed xerogel of nitrocellulose and having an average pore size of the magnitude of about $0.8\mu$.

11. A method of producing the analytical, composite ultrafilter of claim 1, comprising the steps of superposing upon each other a first layer consisting essentially of microfibers of organic synthetic material having average diameters larger than $1\mu$, and a second layer consisting essentially of a xerogel of polymeric material; compressing said superposed layers; and adhering said superposed layers to each other.

References Cited

UNITED STATES PATENTS

| | | | |
|---|---|---|---|
| 2,731,326 | 1/1956 | Alexander et al. | 252—317 X |
| 2,731,340 | 1/1956 | Seifert | 252—317 X |
| 3,163,104 | 12/1964 | Lapham | 100—38 |
| 3,251,475 | 5/1966 | Till et al. | 210—508 |

HARRY B. THORNTON, *Primary Examiner.*

LEON D. ROSDOL, *Examiner.*

I. GLUCK, S. W. SOKOLOFF, *Assistant Examiners.*